(12) United States Patent
Hao

(10) Patent No.: US 10,114,254 B2
(45) Date of Patent: Oct. 30, 2018

(54) PIXEL STRUCTURE AND MANUFACTURING METHOD THEREOF

(71) Applicant: Shenzhen China Star Optoelectronics Technology Co., Ltd., Shenzhen (CN)

(72) Inventor: Sikun Hao, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 83 days.

(21) Appl. No.: 15/328,496

(22) PCT Filed: Dec. 15, 2016

(86) PCT No.: PCT/CN2016/110083
§ 371 (c)(1),
(2) Date: Jan. 24, 2017

(87) PCT Pub. No.: WO2018/036029
PCT Pub. Date: Mar. 1, 2018

(65) Prior Publication Data
US 2018/0217426 A1    Aug. 2, 2018

(30) Foreign Application Priority Data

Aug. 26, 2016 (CN) .......................... 2016 1 0741740

(51) Int. Cl.
*G02F 1/1343* (2006.01)
*G02F 1/1333* (2006.01)
*G02F 1/1362* (2006.01)

(52) U.S. Cl.
CPC ...... *G02F 1/1343* (2013.01); *G02F 1/133345* (2013.01); *G02F 1/136286* (2013.01); *G09G 2300/0439* (2013.01)

(58) Field of Classification Search
CPC ............. G02F 1/1343; G02F 1/133345; G02F 1/136286
(Continued)

(56) References Cited

U.S. PATENT DOCUMENTS

2017/0023833 A1*   1/2017   No .................... G02F 1/134309

FOREIGN PATENT DOCUMENTS

CN            104024933 A       9/2014

* cited by examiner

*Primary Examiner* — Lucy P Chien
(74) *Attorney, Agent, or Firm* — Leong C. Lei

(57) ABSTRACT

The present invention provides a pixel structure and a manufacturing method thereof. The pixel structure according to the present invention is such that two pixel electrodes that are not connected to each other are arranged in a single pixel structure and the two pixel electrodes are respectively connected to two data lines through respective thin-film transistors. In normal displaying, the two data lines are respectively applied with different voltages so that the two pixel electrodes are respectively set at different potentials. The different potentials of the two pixel electrodes cause liquid crystal molecules that are close to different ones of the pixel electrodes to show different polar angles so as to achieve distribution and existence of multiple polar angles in the liquid crystal, reducing the amount of phase difference of liquid crystal in different directions and thus improving the view angle and color shift of a vertical alignment liquid crystal display. The manufacturing method of the pixel structure according to the present invention is such that a manufacturing operation can be conducted easily and a pixel structure so manufactured allows for, in normal displaying, achievement of distribution and existence of multiple polar angles in liquid crystal, reducing the amount of phase difference of liquid crystal in different directions and thus (Continued)

improving the view angle and color shift of a vertical alignment liquid crystal display.

7 Claims, 11 Drawing Sheets

(58) Field of Classification Search
USPC .......................................................... 349/139
See application file for complete search history.

PIXEL STRUCTURE AND MANUFACTURING METHOD THEREOF

BACKGROUND OF THE INVENTION

1. Field of the Invention

The present invention relates to the field of display technology, and more particular to a pixel structure and a manufacturing method thereof.

2. The Related Arts

With the development of the display technology, flat panel display devices, such as liquid crystal display (LCD), due to various advantages, such as high image quality, low power consumption thin device body, and wide applications, have been widely used in various consumer electronic devices, such as mobile phones, televisions, personal digital assistants, digital cameras, notebook computers, and desktop computers, or screens, and becomes a mainstream of display devices.

Most of the liquid crystal display devices that are currently available in the market are backlighting liquid crystal displays, which comprise a liquid crystal display panel and a backlight module. The working principle of the liquid crystal display panel is that with liquid crystal molecules disposed between two parallel glass substrates and multiple vertical and horizontal tiny conductive wires arranged between the two glass substrates, electricity is applied to control direction change of the liquid crystal molecules for refracting out light emitting from the backlight module to generate an image.

The liquid crystal display panel is generally made up of a color filter (CF) substrate, a thin-film transistor (TFT) substrate, liquid crystal (LC) interposed between the CF substrate and the TFT substrate, and sealant.

However, compared to cathode ray tube displays, the thin-film transistor liquid crystal display (TFT-LCD) has a relatively narrow view angle and this imposes significant limitation to the application thereof in the field of high-end displays, where the requirement for view angle is more severe, such as the fields of aviation and aeronautics and medicine. With the quick progress of wide view angle techniques of the LCD field, most of the products that are currently available have view angles that may reach 85°/85° for horizontal view angle and vertical view angle, respectively, or even larger view angles.

The currently known wide view angle techniques of LCD generally include multi-domain vertical alignment (MVA) technology and in-plane switching (IPS) technology. The MVA technology has an advantage of having a high front side contrast, which can reach 4000:1 or higher. The IPS technology provides pixel electrodes and common electrodes that are formed on a thin-film transistor array substrate and are parallel and repeatedly arranged to cause the liquid crystal molecules to rotate under horizontal electric fields thereby forming a wide view angle; however, the contrast thereof is relatively low, generally below 2000:1.

As shown in FIG. 1, a conventional pixel structure of a vertical alignment liquid crystal display is shown, which comprises a thin-film transistor 100 and a pixel electrode 200 electrically connected to the thin-film transistor 100. The pixel electrode 200 is made up of four zones 210. When driven by the pixel electrode 200, liquid crystal molecules in one of the zones 210 of the pixel electrode 200 exhibit the same polarization angle (which is an included angle between a major axis of the liquid crystal molecule and a display screen), so that when the display screen is viewed from different view angles, due to the birefringence effect of the liquid crystal molecules, the same liquid crystal molecule exhibits different refractive indices as being observed from different view angles, the intensity of light received is also different. Specifically speaking, the greater the view angle of observation is, the lower the screen brightness will be, so that the view angle characteristic of a liquid crystal display that uses the pixel structure is poor.

SUMMARY OF THE INVENTION

Objective of the present invention are to provide a pixel structure that helps improve view angle and color shift of a vertical alignment liquid crystal display.

Objective of the present invention are also to provide a manufacturing method of a pixel structure, which helps improve view angle and color shift of a vertical alignment liquid crystal display.

To achieve the above objectives, the present invention provides a pixel structure, which comprises a backing plate, a first metal layer arranged on the backing plate, a first insulation layer arranged on the first metal layer and the backing plate, a semiconductor layer arranged on the first insulation layer, a second metal layer arranged on the semiconductor layer and the first insulation layer, a second insulation layer arranged on the second metal layer, the semiconductor layer, and the first insulation layer, and a transparent conductive layer arranged on the second insulation layer;

wherein the first metal layer comprises a scan line;

wherein the semiconductor layer comprises a first active layer and a second active layer that are spaced from each other, and the first active layer and the second active layer are both arranged to be located above and correspond to the scan line;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode;

wherein the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

wherein the transparent conductive layer comprises a first pixel electrode and a second pixel electrode that are not connected to each other; and wherein the second insulation layer comprises a first via formed therein and located above and corresponding to the first drain electrode and a second via formed therein and located above and corresponding to the second drain electrode, wherein the first pixel electrode is set in contact engagement with the first drain electrode through the first via and the second pixel electrode is set in contact engagement with the second drain electrode through the second via.

The first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire".

The second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas.

The frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode.

The first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

The present invention also provides a manufacturing method of a pixel structure, which comprises the following steps:

Step 1: providing a backing plate and forming a first metal layer on the backing plate, wherein the first metal layer comprises a scan line;

Step 2: forming a first insulation layer on the first metal layer and the backing plate;

Step 3: forming a semiconductor layer on the first insulation layer, wherein the semiconductor layer comprises a first active layer and a second active layer spaced from each other and the first active layer and the second active layer are arranged to be located above and correspond to the scan line;

Step 4: forming a second metal layer on the semiconductor layer and the first insulation layer;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode; and the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

Step 5: forming a second insulation layer on the second metal layer, the semiconductor layer, and the first insulation layer;

wherein the second insulation layer is formed with a first via that is located above and corresponds to the first drain electrode and a second via that is located above and corresponds to the second drain electrode; and Step 6: forming a transparent conductive layer on the second insulation layer, wherein the transparent conductive layer comprises a first pixel electrode and a second pixel electrode that are not connected to each other;

wherein the first pixel electrode is set in contact engagement with the first drain electrode through the first via; and the second pixel electrode is set in contact engagement with the second drain electrode through the second via.

The first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire".

The second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas.

The frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode.

The first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

The present invention further provides a pixel structure, which comprises a backing plate, a first metal layer arranged on the backing plate, a first insulation layer arranged on the first metal layer and the backing plate, a semiconductor layer arranged on the first insulation layer, a second metal layer arranged on the semiconductor layer and the first insulation layer, a second insulation layer arranged on the second metal layer, the semiconductor layer, and the first insulation layer, and a transparent conductive layer arranged on the second insulation layer;

wherein the first metal layer comprises a scan line;

wherein the semiconductor layer comprises a first active layer and a second active layer that are spaced from each other, and the first active layer and the second active layer are both arranged to be located above and correspond to the scan line;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode;

wherein the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

wherein the transparent conductive layer comprises a first pixel electrode and a second pixel electrode that are not connected to each other; and wherein the second insulation layer comprises a first via formed therein and located above and corresponding to the first drain electrode and a second via formed therein and located above and corresponding to the second drain electrode, wherein the first pixel electrode is set in contact engagement with the first drain electrode through the first via and the second pixel electrode is set in contact engagement with the second drain electrode through the second via;

wherein the first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire";

wherein the second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas;

wherein the frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode; and wherein the first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

The efficacy of the present invention is that the present invention provides a pixel structure, in which two pixel electrodes that are not connected to each other are arranged in a single pixel structure and the two pixel electrodes are respectively connected to two data lines through respective thin-film transistors. In normal displaying, the two data lines are respectively applied with different voltages so that the two pixel electrodes are respectively set at different potentials. The different potentials of the two pixel electrodes cause liquid crystal molecules that are close to different ones of the pixel electrodes to show different polar angles so as to achieve distribution and existence of multiple polar angles in the liquid crystal, reducing the amount of phase difference of liquid crystal in different directions and thus improving the view angle and color shift of a vertical alignment liquid crystal display. The present invention also provides a manufacturing method of the pixel structure, in which a manufacturing operation can be conducted easily and a pixel structure so manufactured allows for, in normal displaying, achievement of distribution and existence of multiple polar angles in liquid crystal, reducing the amount of phase difference of liquid crystal in different directions and thus improving the view angle and color shift of a vertical alignment liquid crystal display.

For better understanding of the features and technical contents of the present invention, reference will be made to the following detailed description of the present invention and the attached drawings. However, the drawings are provided only for reference and illustration and are not intended to limit the present invention.

BRIEF DESCRIPTION OF THE DRAWINGS

The technical solution, as well as other beneficial advantages, of the present invention will become apparent from the following detailed description of embodiments of the present invention, with reference to the attached drawings.

In the drawings.

DETAILED DESCRIPTION OF THE PREFERRED EMBODIMENTS

Figure 1:
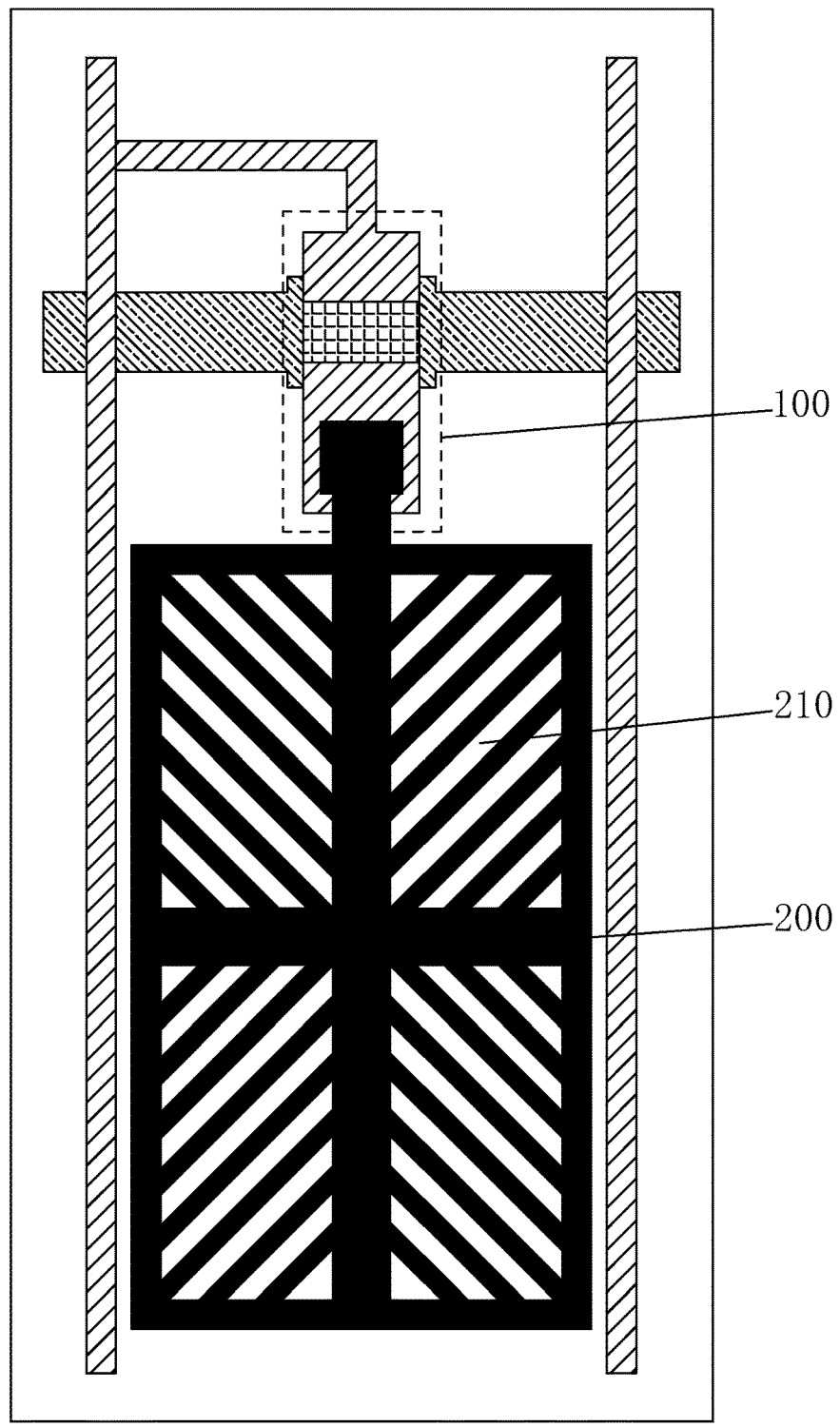
FIG. 1 is a schematic top plan view illustrating a conventional pixel structure of a vertical alignment liquid crystal display.

To further expound the technical solution adopted in the present invention and the advantages thereof, a detailed description will be given with reference to the preferred embodiments of the present invention and the drawings thereof.

Referring to FIGS. 2-10, the present invention provides a pixel structure, which comprises a backing plate 10, a first metal layer 20 arranged on the backing plate 10, a first insulation layer 30 arranged on the first metal layer 20 and the backing plate 10, a semiconductor layer 40 arranged on the first insulation layer 30, a second metal layer 50 arranged on the semiconductor layer 40 and the first insulation layer 30, a second insulation layer 60 arranged on the second metal layer 50, the semiconductor layer 40, and the first insulation layer 30, and a transparent conductive layer 70 arranged on the second insulation layer 60.

Figure 5:
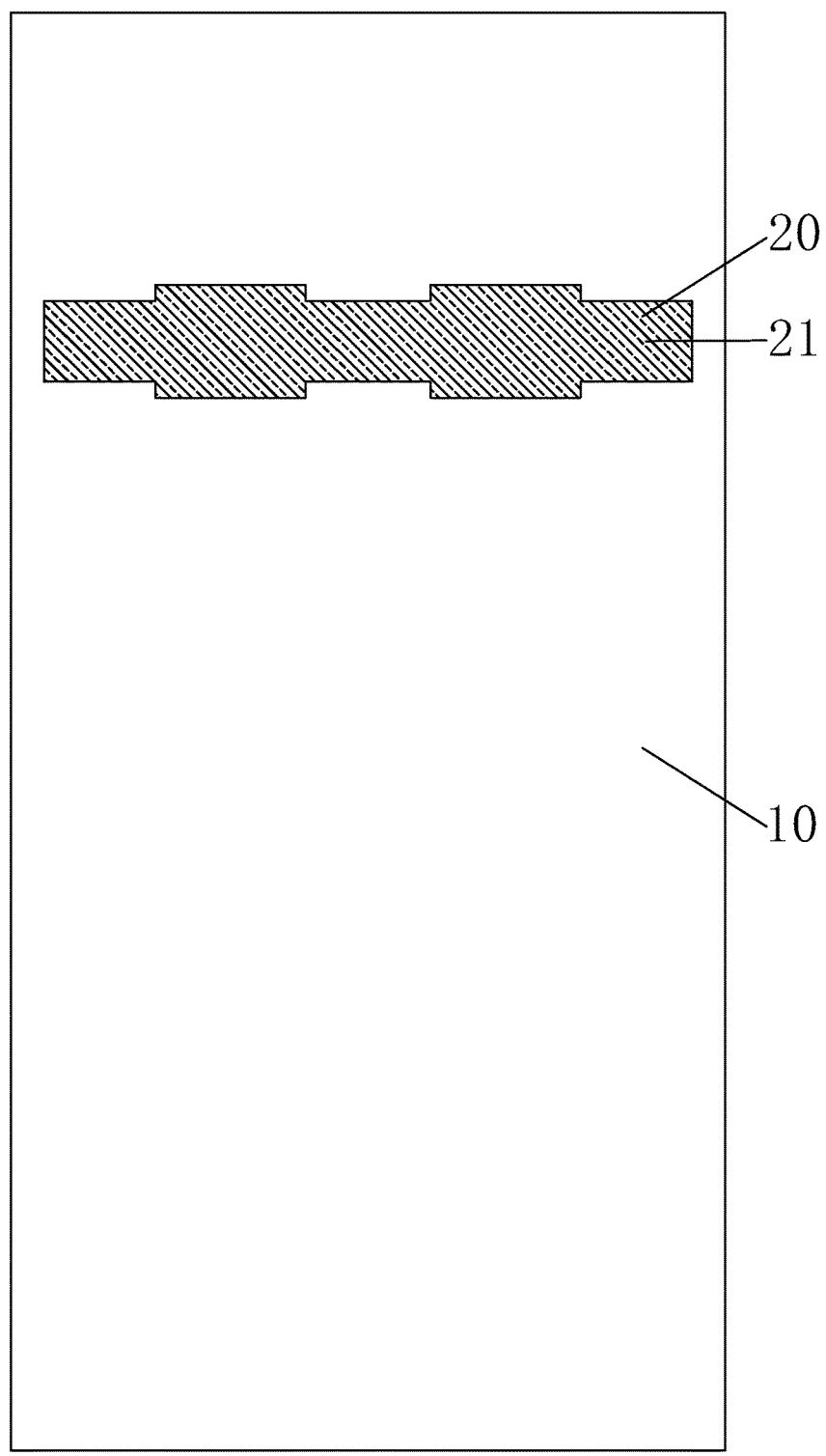
FIG. 5 is a schematic top plan view showing a first metal layer of the pixel structure according to the present invention.

As shown in FIG. 5, the first metal layer 20 comprises a scan line 21.

Figure 7:
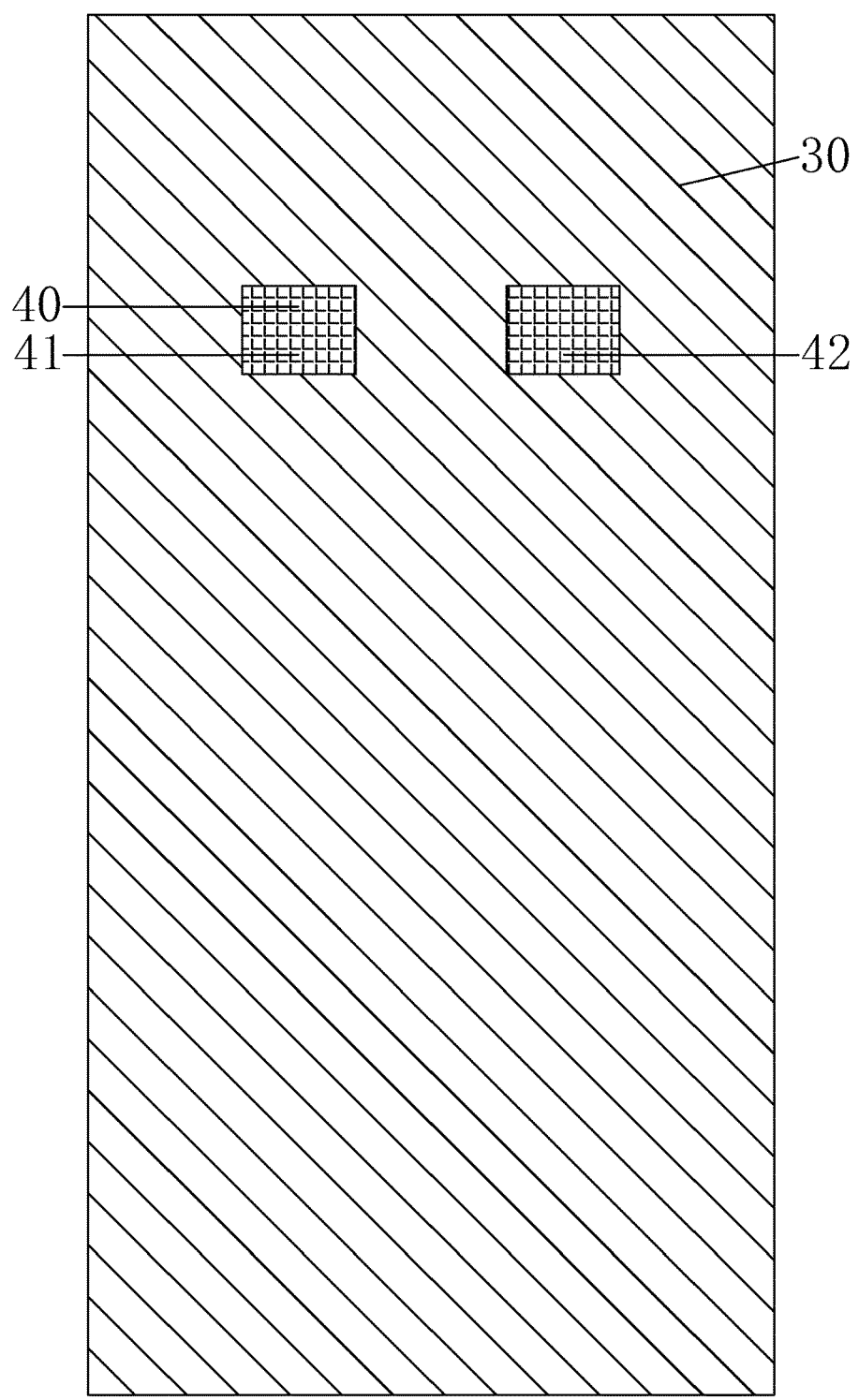
FIG. 7 is a schematic top plan view showing a semiconductor layer of the pixel structure according to the present invention.

As shown in FIG. 7, the semiconductor layer 40 comprises a first active layer 41 and a second active layer 42 that are spaced from each other, and the first active layer 41 and the second active layer 42 are both arranged to be located above and correspond to the scan line 21.

Figure 8:
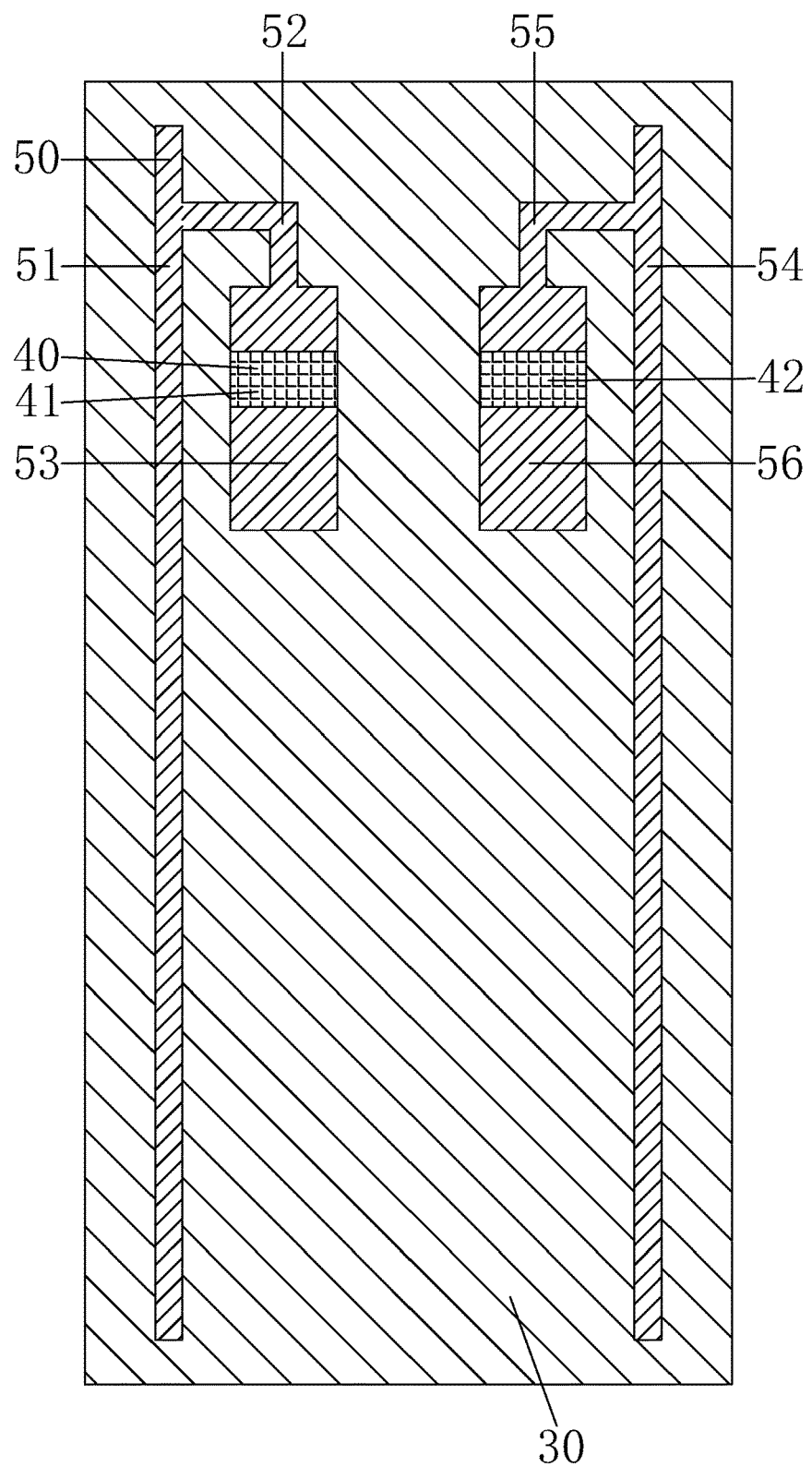
FIG. 8 is a schematic top plan view showing a second metal layer of the pixel structure according to the present invention.

As shown in FIG. 8, the second metal layer 50 comprises a first data line 51, a first source electrode 52 connected to one side of the first data line 51, a first drain electrode 53 spaced from the first source electrode 52, a second data line 54, a second source electrode 55 connected to one side of the second data line 54, and a second drain electrode 56 spaced from the second source electrode 55.

The first data line 51 and the second data line 54 are each arranged across over the scan line 21 in a manner of being substantially perpendicular thereto; the first source electrode 52 and the first drain electrode 53 are respectively set in contact engagement with two opposite sides of the first active layer 41; and the second source electrode 55 and the second drain electrode 56 are respectively set in contact engagement with two opposite sides of the second active layer 42.

Figure 10:
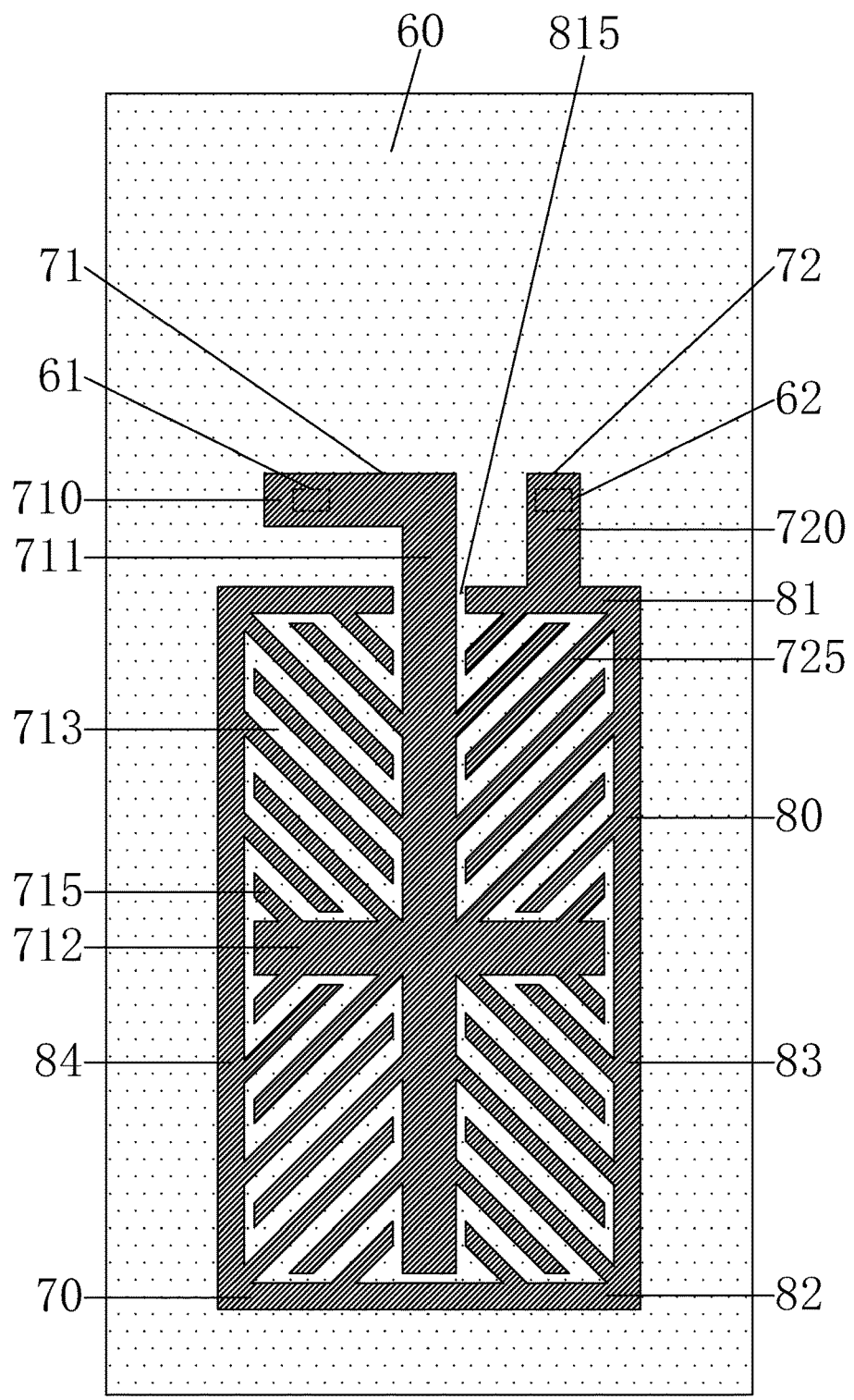
FIG. 10 is a schematic top plan view showing a transparent conductive layer of the pixel structure according to the present invention.

As shown in FIG. 10, the transparent conductive layer 70 comprises a first pixel electrode 71 and a second pixel electrode 72 that are not connected to each other.

As shown in FIG. 10 and FIGS. 2-4, the second insulation layer 60 comprises a first via 61 formed therein and located above and corresponding to the first drain electrode 53 and a second via 61 formed therein and located above and corresponding to the second drain electrode 56. The first pixel electrode 71 is set in contact engagement with the first drain electrode 53 through the first via 61; and the second pixel electrode 72 is set in contact engagement with the second drain electrode 56 through the second via 62.

Specifically, the first pixel electrode 71 comprises a vertical trunk electrode 711 and a horizontal trunk electrode 712, which intersect each other in a manner of being perpendicular to each other, and four pixel electrode areas 713 that defined by the perpendicular intersection between the horizontal trunk electrode 712 and the vertical trunk electrode 711. Each of the pixel electrode areas 713 comprises a plurality of first strip-like branch electrodes 715 that are connected to the horizontal trunk electrode 712 or the vertical trunk electrode 711 at an angle of ±45° or ±135° therebetween. The plurality of first strip-like branch electrodes 715 of the four pixel electrode areas 713 are arranged symmetric with respect to the horizontal trunk electrode 712 and the vertical trunk electrode 711 in a left-right direction and a top-down direction so as to form a pixel electrode configuration of superimposition of a "cross" and a "saltire".

Specifically, the second pixel electrode 72 comprises a frame electrode 80 located outside a periphery of the first pixel electrode 71 and a plurality of second strip-like branch electrodes 725 each connected to the frame electrode 80. The plurality of second strip-like branch electrodes 725 are arranged and distributed in the four pixel electrode areas 713 of the first pixel electrode 71 and are also arranged to parallel and alternate with the first strip-like branch electrodes 715 in each of the pixel electrode areas 713.

Specifically, the frame electrode 80 comprises a first horizontal electrode 81 and a second horizontal electrode 82 that are substantially parallel to the horizontal trunk electrode 712 and a first vertical electrode 83 and a second vertical electrode 84 that are substantially parallel to the vertical trunk electrode 711; and the first horizontal electrode 81, the first vertical electrode 83, the second horizontal electrode 82, and the second vertical electrode 84 are connected to each other in sequence; the first horizontal electrode 81 is arranged close to the first drain electrode 53 and the second drain electrode 56; the first horizontal electrode 81 comprises an opening 815 formed therein such that the vertical trunk electrode 711 of the first pixel electrode 71 is extended through the opening 815 and is not in connection with portions of the first horizontal electrode 81 on two sides of the opening 815 and the second horizontal electrode 82.

Further, the first pixel electrode 71 comprises a first connection electrode 710 connected to the vertical trunk electrode 711. The first connection electrode 710 is set in contact engagement with the first drain electrode 53 through the first via 61 so as to have the first pixel electrode 71 electrically connected to the first drain electrode 53.

Further, the second pixel electrode 72 comprises a second connection electrode 720 connected to the frame electrode 80. The second connection electrode 720 is set in contact engagement with the second drain electrode 56 through the second via 62 so as to have the second pixel electrode 72 electrically connected to the second drain electrode 56. Preferably, the second connection electrode 720 is connected to the first horizontal electrode 81.

Specifically, the backing plate 10 comprises a transparent plate; and preferably, the backing plate 10 comprises a glass plate.

Specifically, the first metal layer 20 and the second metal layer 50 are formed of a material that comprises at least one of molybdenum (Mo), aluminum (Al), copper (Cu), and titanium (Ti).

Specifically, the semiconductor layer 40 is formed of a material that comprises at least one of amorphous silicon, poly-silicon, and a metal oxide semiconductor material. The metal oxide semiconductor material can be indium gallium zinc oxide (IGZO).

Specifically, the first insulation layer 30 and the second insulation layer 60 are formed of a material that comprises at least one of silicon oxide (SiOx) and silicon nitride (SiNx).

Specifically, the first pixel electrode 71 and the second pixel electrode 72 are both formed of a material comprising a transparent conductive metal oxide, and the transparent conductive metal oxide is preferably indium tin oxide (ITO).

The above-described pixel structure is such that two pixel electrodes that are not connected to each other are arranged in a single pixel structure and the two pixel electrodes are respectively connected to two data lines through respective thin-film transistors. In normal displaying, the two data lines are respectively applied with different voltages so that the two pixel electrodes are respectively set at different potentials. The different potentials of the two pixel electrodes cause liquid crystal molecules that are close to different ones of the pixel electrodes to show different polar angles so as to achieve distribution and existence of multiple polar angles in the liquid crystal, reducing the amount of phase difference of liquid crystal in different directions and thus improving the view angle and color shift of a vertical alignment liquid crystal display.

Figure 11:
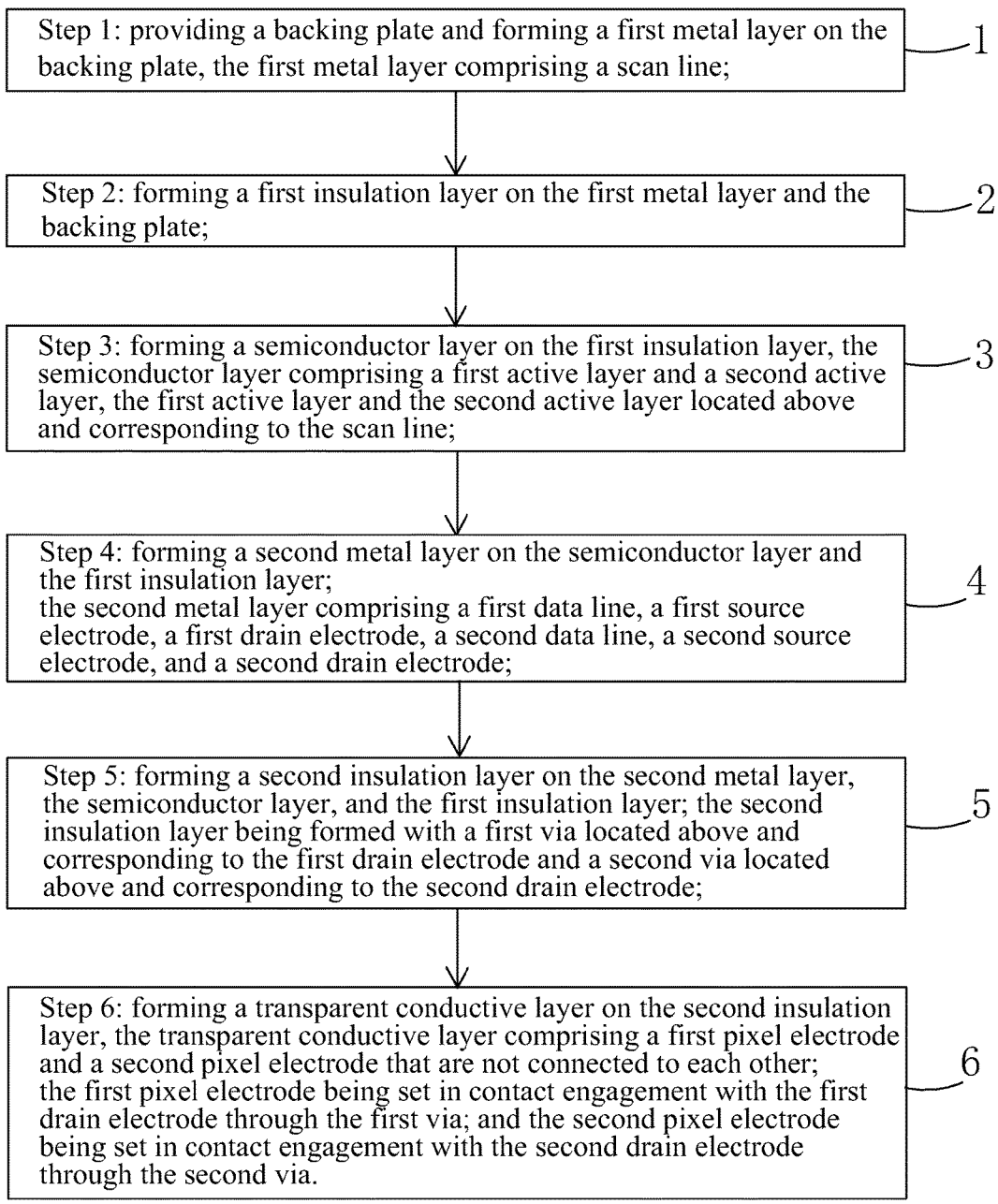
FIG. 11 is a flow chart illustrating a manufacturing method of a pixel structure according to the present invention.

Referring to FIG. 11, the present invention also provides a manufacturing method of the above-described pixel structure, comprising the following steps:

Step 1: as shown in FIG. 5, providing a backing plate 10 and forming a first metal layer 20 on the backing plate 10, wherein the first metal layer 20 comprises a scan line 21.

Specifically, the backing plate 10 comprises a transparent plate; and preferably, the backing plate 10 comprises a glass plate.

Specifically, the first metal layer 20 is formed of a material that comprises at least one of molybdenum (Mo), aluminum (Al), copper (Cu), and titanium (Ti).

Figure 6:
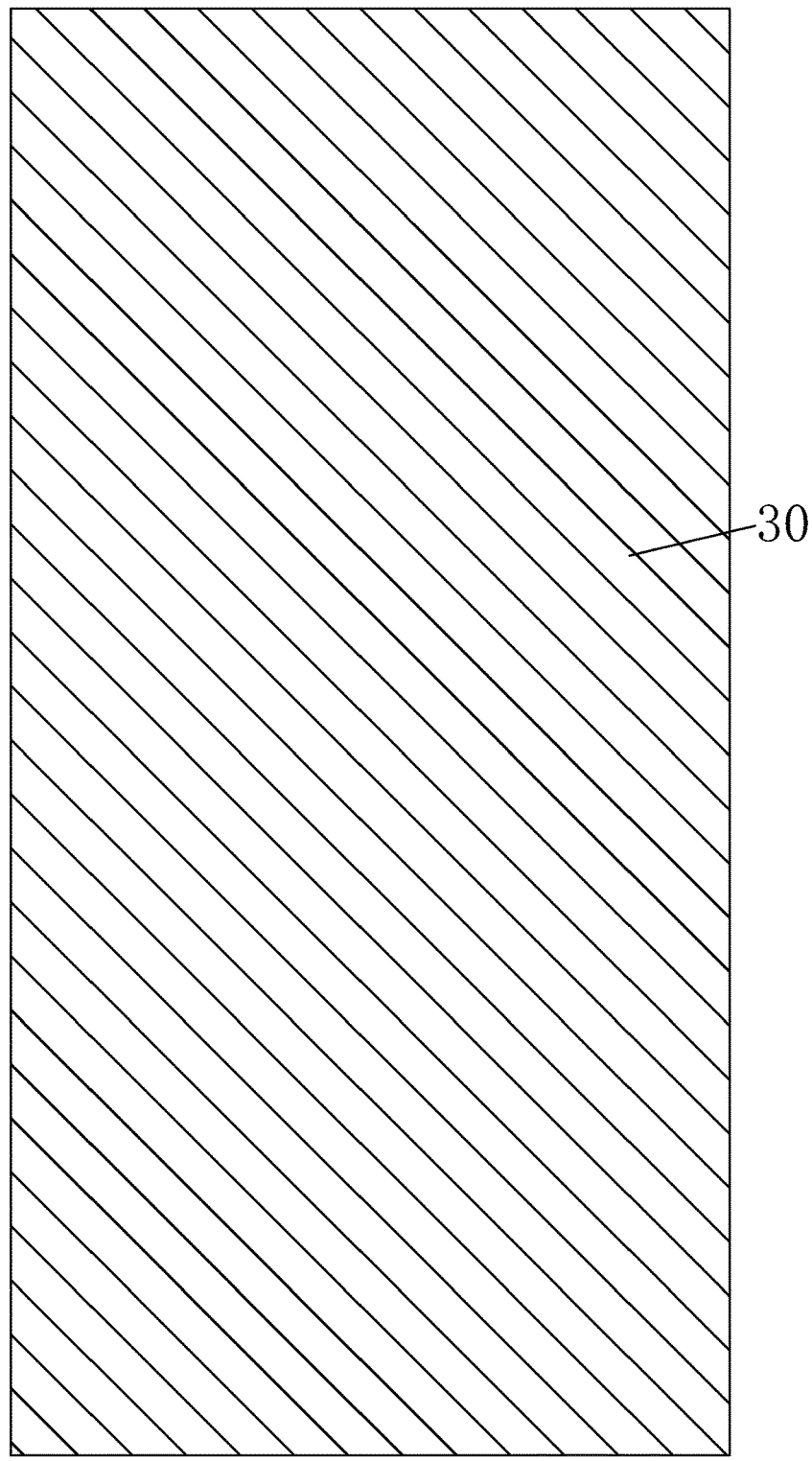
FIG. 6 is a schematic top plan view showing a first insulation layer of the pixel structure according to the present invention.

Step 2: as shown in FIG. 6, forming a first insulation layer 30 on the first metal layer 20 and the backing plate 10.

Specifically, the first insulation layer 30 is formed of a material that comprises at least one of silicon oxide and silicon nitride.

Figure 2:
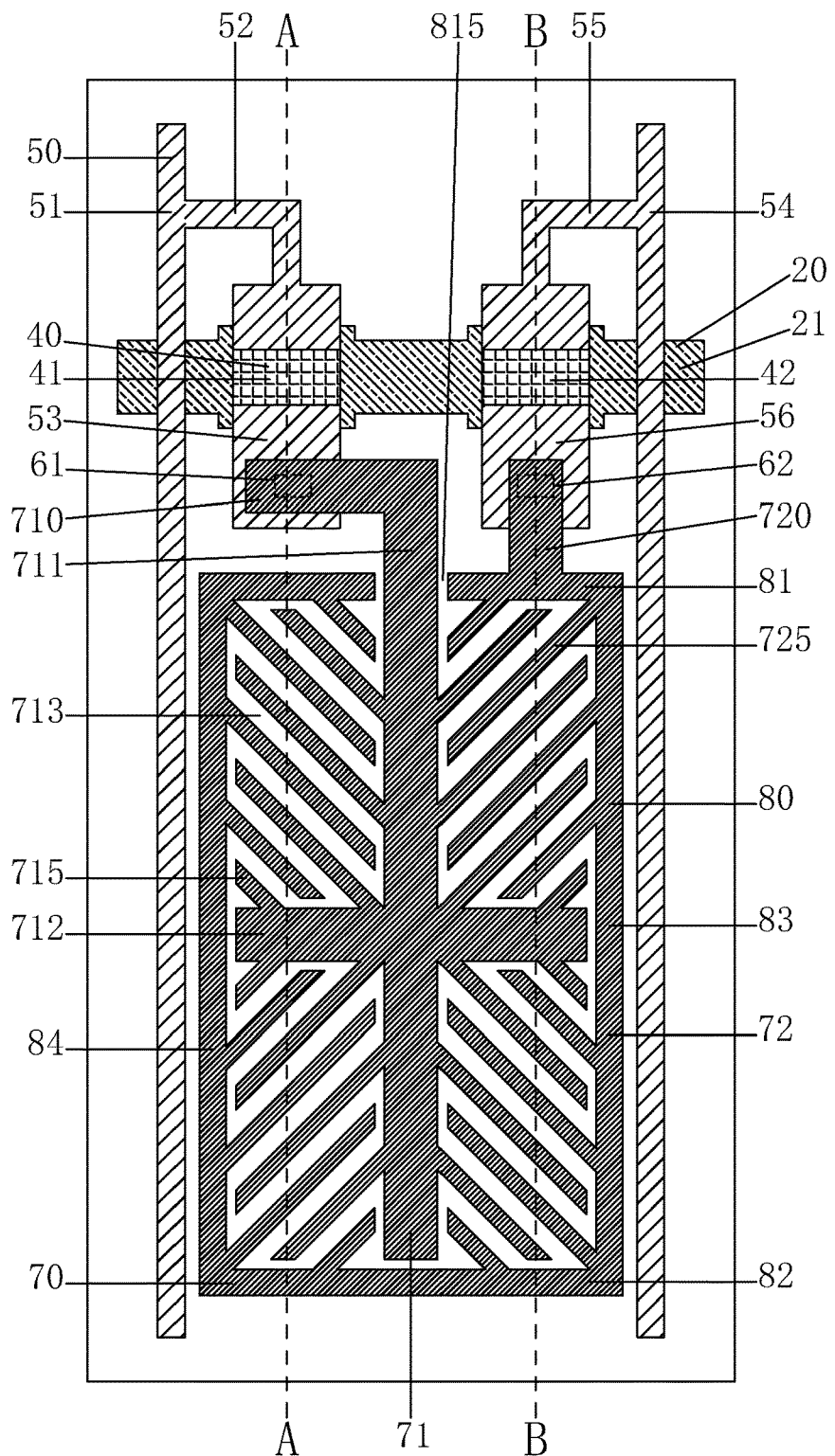
FIG. 2 is a schematic top plan view showing a pixel structure according to the present invention.

Step 3: as shown in FIG. 7, forming a semiconductor layer 40 on the first insulation layer 30, wherein the semiconductor layer 40 comprises a first active layer 41 and a second active layer 42 spaced from each other and as shown in FIG. 2, the first active layer 41 and the second active layer 42 are arranged to be located above and correspond to the scan line 21.

Specifically, the semiconductor layer 40 is formed of a material that comprises at least one of amorphous silicon, poly-silicon, and a metal oxide semiconductor material. The metal oxide semiconductor material can be indium gallium zinc oxide (IGZO).

Step 4: as shown in FIG. 8, forming a second metal layer 50 on the semiconductor layer 40 and the first insulation layer 30;

wherein the second metal layer 50 comprises a first data line 51, a first source electrode 52 connected to one side of the first data line 51, a first drain electrode 53 spaced from the first source electrode 52, a second data line 54, a second source electrode 55 connected to one side of the second data line 54, and a second drain electrode 56 spaced from the second source electrode 55; and the first data line 51 and the second data line 54 are each arranged across over the scan line 21 in a manner of being substantially perpendicular thereto; the first source electrode 52 and the first drain electrode 53 are respectively set in contact engagement with two opposite sides of the first active layer 41; and the second source electrode 55 and the second drain electrode 56 are respectively set in contact engagement with two opposite sides of the second active layer 42.

Specifically, the second metal layer 50 is formed of a material that comprises at least one of molybdenum, aluminum, copper, and titanium.

Figure 3:
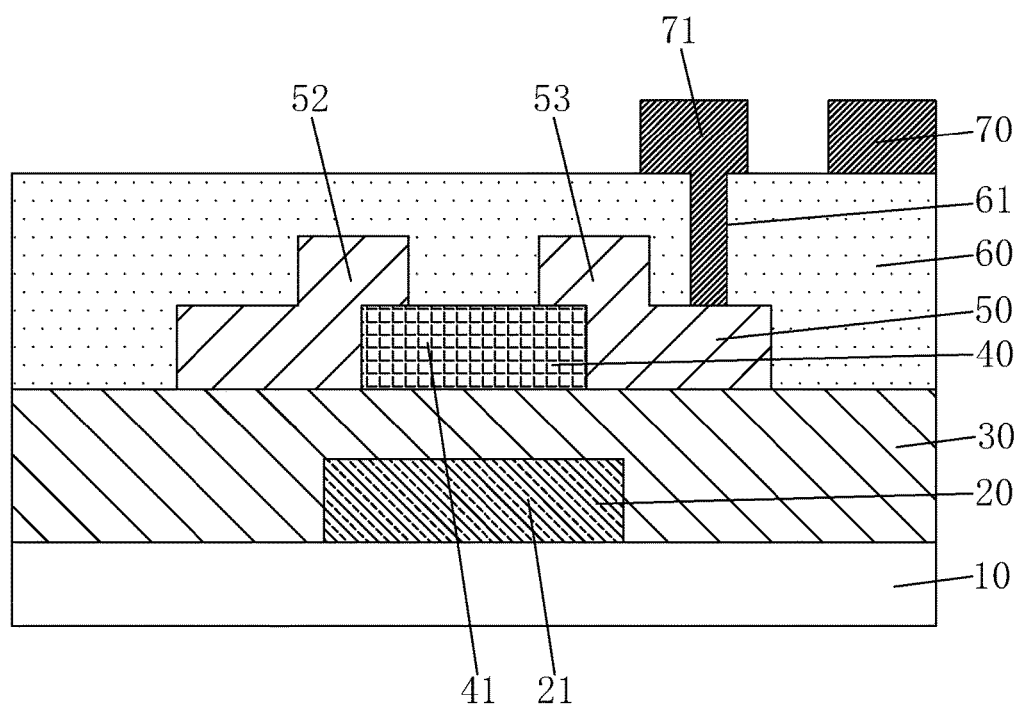
FIG. 3 is a cross-sectional view taken along line A-A of FIG. 2.
Figure 4:
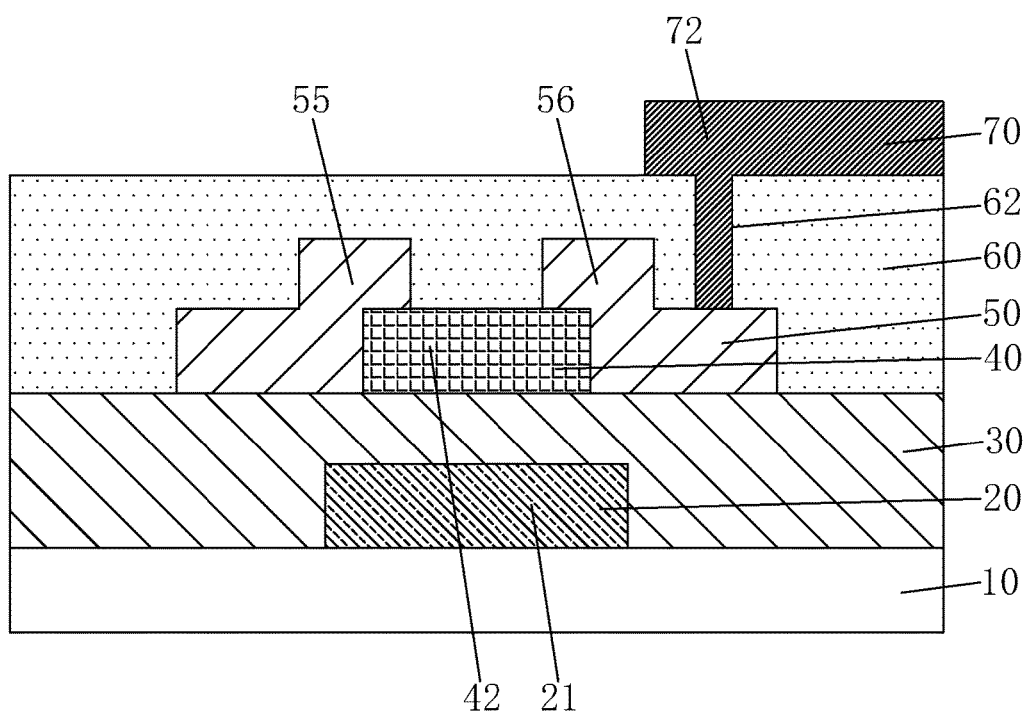
FIG. 4 is a cross-sectional view taken along line B-B of FIG. 2.
Figure 9:
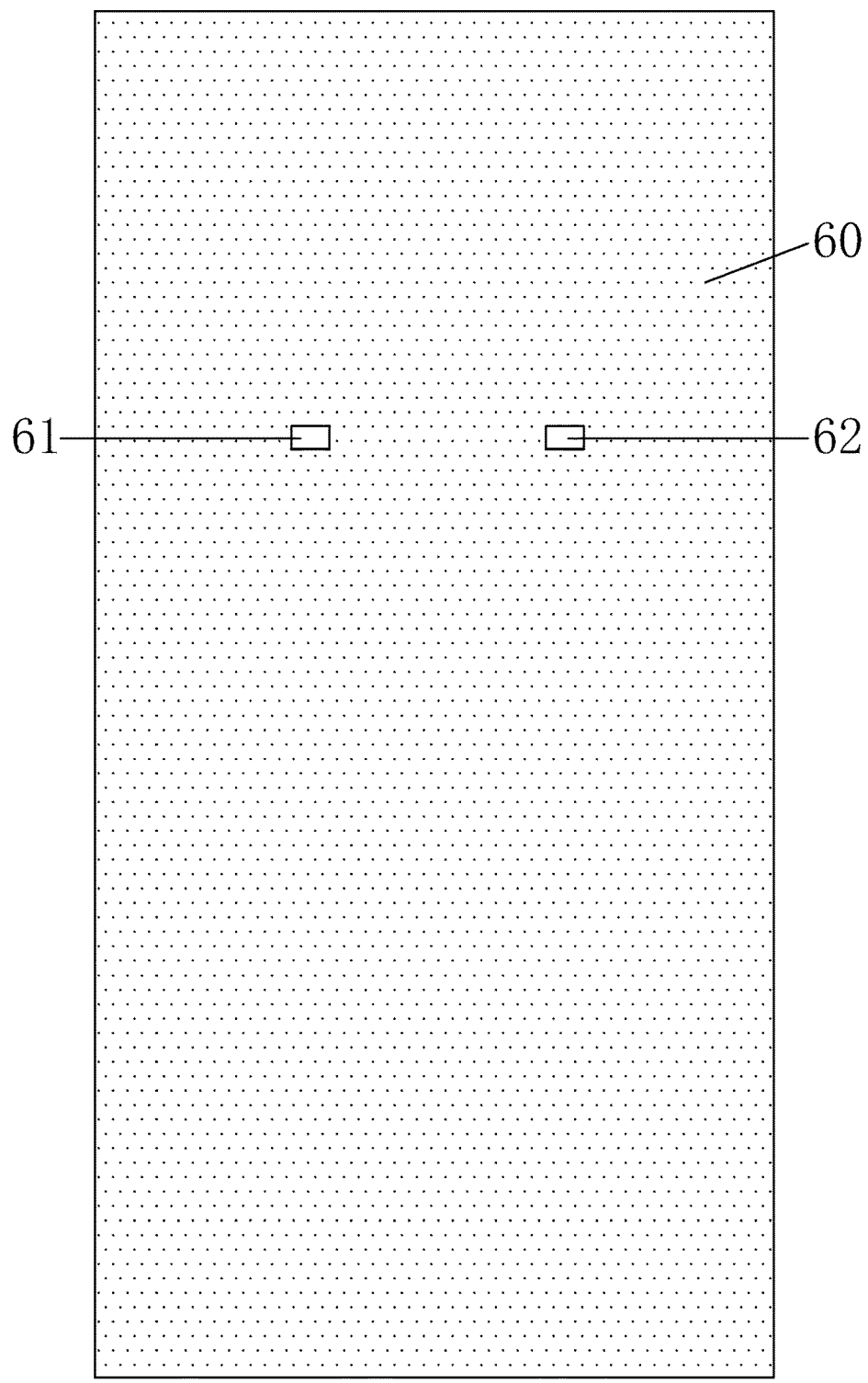
FIG. 9 is a schematic top plan view showing a second insulation layer of the pixel structure according to the present invention.

Step 5: as shown in FIG. 9, forming a second insulation layer 60 on the second metal layer 50, the semiconductor layer 40, and the first insulation layer 30;

wherein as shown in FIGS. 3-4, the second insulation layer 60 is formed with a first via 61 that is located above and corresponds to the first drain electrode 53 and a second via 61 that is located above and corresponds to the second drain electrode 56.

Specifically, the second insulation layer 60 is formed of a material that comprises at least one of silicon oxide and silicon nitride.

Step 6: as shown in FIG. 10, forming a transparent conductive layer 70 on the second insulation layer 60, wherein the transparent conductive layer 70 comprises a first pixel electrode 71 and a second pixel electrode 72 that are not connected to each other;

wherein the first pixel electrode 71 is set in contact engagement with the first drain electrode 53 through the first via 61; and the second pixel electrode 72 is set in contact engagement with the second drain electrode 56 through the second via 62.

Specifically, the first pixel electrode 71 comprises a vertical trunk electrode 711 and a horizontal trunk electrode 712, which intersect each other in a manner of being perpendicular to each other, and four pixel electrode areas 713 that defined by the perpendicular intersection between the horizontal trunk electrode 712 and the vertical trunk electrode 711. Each of the pixel electrode areas 713 comprises a plurality of first strip-like branch electrodes 715 that are connected to the horizontal trunk electrode 712 or the vertical trunk electrode 711 at an angle of ±45° or ±135° therebetween. The plurality of first strip-like branch electrodes 715 of the four pixel electrode areas 713 are arranged symmetric with respect to the horizontal trunk electrode 712 and the vertical trunk electrode 711 in a left-right direction and a top-down direction so as to form a pixel electrode configuration of superimposition of a "cross" and a "saltire".

Specifically, the second pixel electrode 72 comprises a frame electrode 80 located outside a periphery of the first pixel electrode 71 and a plurality of second strip-like branch electrodes 725 each connected to the frame electrode 80. The plurality of second strip-like branch electrodes 725 are arranged and distributed in the four pixel electrode areas 713 of the first pixel electrode 71 and are also arranged to parallel and alternate with the first strip-like branch electrodes 715 in each of the pixel electrode areas 713.

Specifically, the frame electrode 80 comprises a first horizontal electrode 81 and a second horizontal electrode 82 that are substantially parallel to the horizontal trunk electrode 712 and a first vertical electrode 83 and a second vertical electrode 84 that are substantially parallel to the vertical trunk electrode 711; and the first horizontal electrode 81, the first vertical electrode 83, the second horizontal electrode 82, and the second vertical electrode 84 are connected to each other in sequence; the first horizontal electrode 81 is arranged close to the first drain electrode 53 and the second drain electrode 56; the first horizontal electrode 81 comprises an opening 815 formed therein such that the vertical trunk electrode 711 of the first pixel electrode 71 is extended through the opening 815 and is not in connection with portions of the first horizontal electrode 81 on two sides of the opening 815 and the second horizontal electrode 82.

Further, the first pixel electrode 71 comprises a first connection electrode 710 connected to the vertical trunk electrode 711. The first connection electrode 710 is set in contact engagement with the first drain electrode 53 through the first via 61 so as to have the first pixel electrode 71 electrically connected to the first drain electrode 53.

Further, the second pixel electrode 72 comprises a second connection electrode 720 connected to the frame electrode 80. The second connection electrode 720 is set in contact engagement with the second drain electrode 56 through the second via 62 so as to have the second pixel electrode 72 electrically connected to the second drain electrode 56. Preferably, the second connection electrode 720 is connected to the first horizontal electrode 81.

The above-described manufacturing method of a pixel structure is such that a manufacturing operation can be conducted easily and a pixel structure so manufactured allows for, in normal displaying, achievement of distribution and existence of multiple polar angles in liquid crystal, reducing the amount of phase difference of liquid crystal in different directions and thus improving the view angle and color shift of a vertical alignment liquid crystal display.

In summary, the present invention provides a pixel structure and a manufacturing method thereof. The pixel structure according to the present invention is such that two pixel electrodes that are not connected to each other are arranged in a single pixel structure and the two pixel electrodes are respectively connected to two data lines through respective thin-film transistors. In normal displaying, the two data lines are respectively applied with different voltages so that the two pixel electrodes are respectively set at different potentials. The different potentials of the two pixel electrodes cause liquid crystal molecules that are close to different ones of the pixel electrodes to show different polar angles so as to achieve distribution and existence of multiple polar angles in the liquid crystal, reducing the amount of phase difference of liquid crystal in different directions and thus improving the view angle and color shift of a vertical alignment liquid crystal display. The manufacturing method of the pixel structure according to the present invention is such that a manufacturing operation can be conducted easily and a pixel structure so manufactured allows for, in normal displaying, achievement of distribution and existence of multiple polar angles in liquid crystal, reducing the amount of phase difference of liquid crystal in different directions and thus improving the view angle and color shift of a vertical alignment liquid crystal display.

Based on the description given above, those having ordinary skills in the art may easily contemplate various changes and modifications of he technical solution and the technical ideas of the present invention. All these changes and modifications are considered belonging to the protection scope of the present invention as defined in the appended claims.

What is claimed is:

1. A pixel structure, comprising a backing plate, a first metal layer arranged on the backing plate, a first insulation layer arranged on the first metal layer and the backing plate, a semiconductor layer arranged on the first insulation layer, a second metal layer arranged on the semiconductor layer and the first insulation layer, a second insulation layer arranged on the second metal layer, the semiconductor layer, and the first insulation layer, and a transparent conductive layer arranged on the second insulation layer;

wherein the first metal layer comprises a scan line;

wherein the semiconductor layer comprises a first active layer and a second active layer that are spaced from each other, and the first active layer and the second active layer are both arranged to be located above and correspond to the scan line;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode;

wherein the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

wherein the transparent conductive layer comprises a first pixel electrode and a second pixel electrode that are not connected to each other; and wherein the second insulation layer comprises a first via formed therein and located above and corresponding to the first drain electrode and a second via formed therein and located above and corresponding to the second drain electrode, wherein the first pixel electrode is set in contact engagement with the first drain electrode through the first via and the second pixel electrode is set in contact engagement with the second drain electrode through the second via;

wherein the first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire"; and wherein the second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas.

2. The pixel structure as claimed in claim 1, wherein the frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode.

3. The pixel structure as claimed in claim 1, wherein the first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

4. A manufacturing method of a pixel structure, comprising the following steps:

Step 1: providing a backing plate and forming a first metal layer on the backing plate, wherein the first metal layer comprises a scan line;

Step 2: forming a first insulation layer on the first metal layer and the backing plate;

Step 3: forming a semiconductor layer on the first insulation layer, wherein the semiconductor layer comprises a first active layer and a second active layer spaced from each other and the first active layer and the second active layer are arranged to be located above and correspond to the scan line;

Step 4: forming a second metal layer on the semiconductor layer and the first insulation layer;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode; and the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

Step 5: forming a second insulation layer on the second metal layer, the semiconductor layer, and the first insulation layer;

wherein the second insulation layer is formed with a first via that is located above and corresponds to the first drain electrode and a second via that is located above and corresponds to the second drain electrode; and Step 6: forming a transparent conductive layer on the second insulation layer, wherein the transparent conductive layer comprises a first pixel electrode and a second pixel electrode that are not connected to each other;

wherein the first pixel electrode is set in contact engagement with the first drain electrode through the first via; and the second pixel electrode is set in contact engagement with the second drain electrode through the second via;

wherein the first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire"; and wherein the second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas.

5. The manufacturing method of the pixel structure as claimed in claim 4, wherein the frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode.

6. The manufacturing method of the pixel structure as claimed in claim 4, wherein the first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

7. A pixel structure, comprising a backing plate, a first metal layer arranged on the backing plate, a first insulation layer arranged on the first metal layer and the backing plate, a semiconductor layer arranged on the first insulation layer, a second metal layer arranged on the semiconductor layer and the first insulation layer, a second insulation layer arranged on the second metal layer, the semiconductor layer, and the first insulation layer, and a transparent conductive layer arranged on the second insulation layer;

wherein the first metal layer comprises a scan line;

wherein the semiconductor layer comprises a first active layer and a second active layer that are spaced from each other, and the first active layer and the second active layer are both arranged to be located above and correspond to the scan line;

wherein the second metal layer comprises a first data line, a first source electrode connected to one side of the first data line, a first drain electrode spaced from the first source electrode, a second data line, a second source electrode connected to one side of the second data line, and a second drain electrode spaced from the second source electrode;

wherein the first data line and the second data line are each arranged across over the scan line in a manner of being substantially perpendicular thereto; the first source electrode and the first drain electrode are respectively set in contact engagement with two opposite sides of the first active layer; and the second source electrode and the second drain electrode are respectively set in contact engagement with two opposite sides of the second active layer;

wherein the transparent conductive layer comprises a first pixel electrode and a second pixel electrode that are not connected to each other; and wherein the second insulation layer comprises a first via formed therein and located above and corresponding to the first drain electrode and a second via formed therein and located above and corresponding to the second drain electrode, wherein the first pixel electrode is set in contact engagement with the first drain electrode through the first via and the second pixel electrode is set in contact engagement with the second drain electrode through the second via;

wherein the first pixel electrode comprises a vertical trunk electrode and a horizontal trunk electrode, which intersect each other in a manner of being perpendicular to each other, and four pixel electrode areas that defined by the perpendicular intersection between the horizontal trunk electrode and the vertical trunk electrode, each of the pixel electrode areas comprising a plurality of first strip-like branch electrodes that are connected to the horizontal trunk electrode or the vertical trunk electrode at an angle of ±45° or ±135° therebetween, the plurality of first strip-like branch electrodes of the four pixel electrode areas being arranged symmetric with respect to the horizontal trunk electrode and the vertical trunk electrode in a left-right direction and a top-down direction so as to form a pixel electrode configuration of superimposition of a "cross" and a "saltire";

wherein the second pixel electrode comprises a frame electrode located outside a periphery of the first pixel electrode and a plurality of second strip-like branch electrodes each connected to the frame electrode, the plurality of second strip-like branch electrodes being arranged and distributed in the four pixel electrode areas of the first pixel electrode and being also arranged to parallel and alternate with the first strip-like branch electrodes in each of the pixel electrode areas;

wherein the frame electrode comprises a first horizontal electrode and a second horizontal electrode that are substantially parallel to the horizontal trunk electrode and a first vertical electrode and a second vertical electrode that are substantially parallel to the vertical trunk electrode; and the first horizontal electrode, the first vertical electrode, the second horizontal electrode, and the second vertical electrode are connected to each other in sequence; the first horizontal electrode is arranged close to the first drain electrode and the second drain electrode; the first horizontal electrode comprises an opening formed therein such that the vertical trunk electrode of the first pixel electrode is extended through the opening and is not in connection with portions of the first horizontal electrode on two sides of the opening and the second horizontal electrode; and wherein the first pixel electrode comprises a first connection electrode connected to the vertical trunk electrode, and the first connection electrode is set in contact engagement with the first drain electrode through the first via so as to have the first pixel electrode electrically connected to the first drain electrode; and the second pixel electrode comprises a second connection electrode connected to the frame electrode and the second connection electrode is set in contact engagement with the second drain electrode through the second via so as to have the second pixel electrode electrically connected to the second drain electrode.

* * * * *